Figure 10:
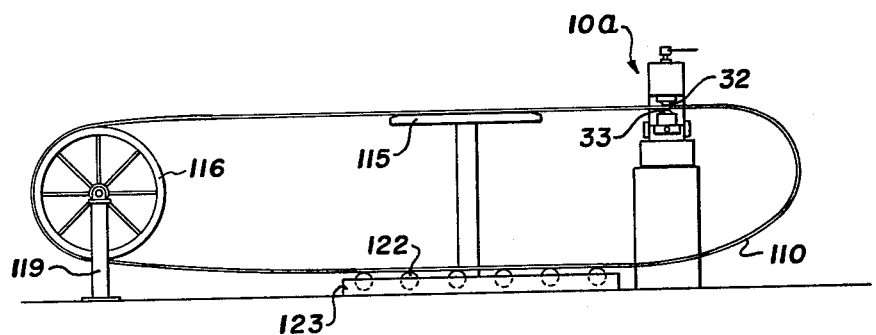

United States Patent [19]

Williams

[11] 4,085,630
[45] Apr. 25, 1978

[54] APPARATUS FOR ADJUSTING CONDITION OF METAL OF SAWS

[76] Inventor: Christopher Williams, 5490 Forglen Dr., South Burnaby, British Columbia, Canada, V5H 3K7

[21] Appl. No.: 717,937

[22] Filed: Aug. 26, 1976

[30] Foreign Application Priority Data

Jun. 8, 1976 Canada .................................. 254343

[51] Int. Cl.² ........................................... B23D 63/18
[52] U.S. Cl. ...................................................... 76/27
[58] Field of Search .................................. 76/27, 25 R

[56] References Cited

U.S. PATENT DOCUMENTS

| 913,463 | 2/1909 | Bottem | 76/27 |
| 1,038,127 | 9/1912 | Hedstrom | 76/27 |
| 1,462,836 | 7/1923 | Thomas | 76/27 |

FOREIGN PATENT DOCUMENTS

| 1,011,676 | 4/1952 | France | 76/27 |
| 939,488 | 4/1948 | France | 76/27 |
| 2,054,872 | 5/1972 | Germany | 76/27 |

Primary Examiner—Harold D. Whitehead
Assistant Examiner—Roscoe V. Parker
Attorney, Agent, or Firm—Fetherstonhaugh & Company

[57] ABSTRACT

Apparatus including upper and lower rolls between which a supported saw extends, the lower roll having an annular groove in the periphery thereof dividing it into two annular roll sections. Pressure means connected to the upper roll is operable to move the roll to press the saw against the lower roll, and power means is connected to the lower roll to rotate the later to cause the saw to move between the rolls. The lower roll is movable axially to bring either of the annular sections or the groove thereof into position opposing the upper roll.

14 Claims, 10 Drawing Figures

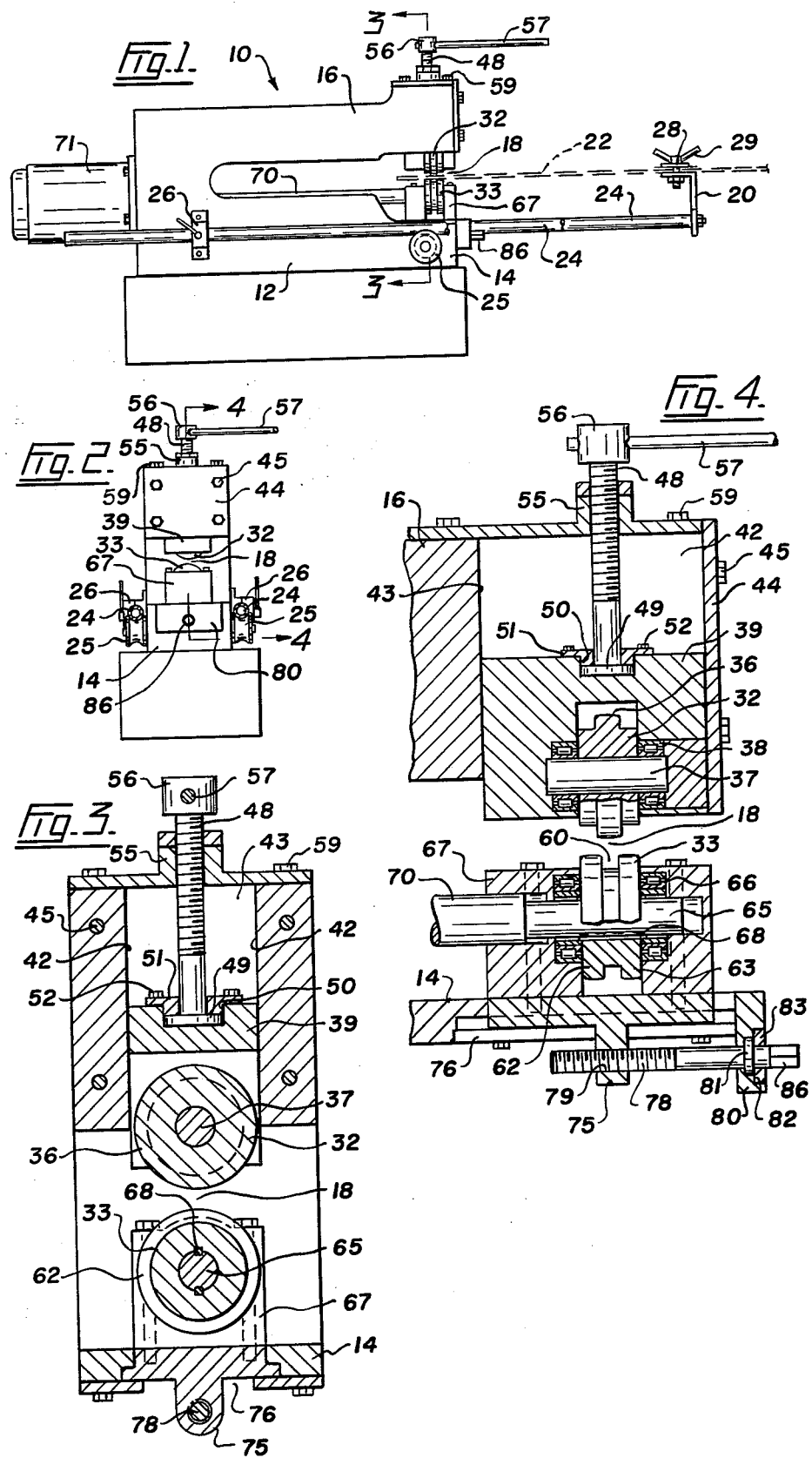

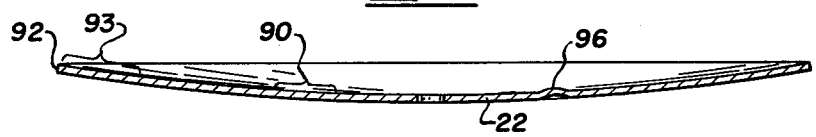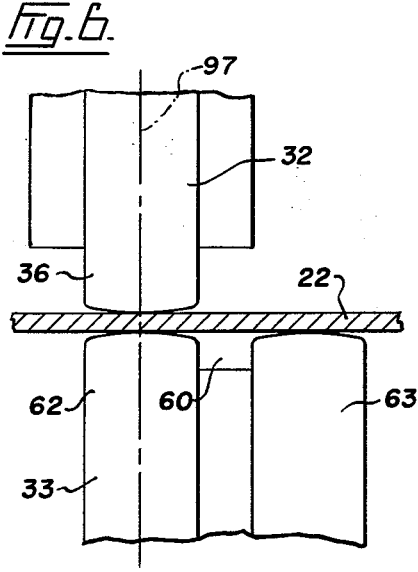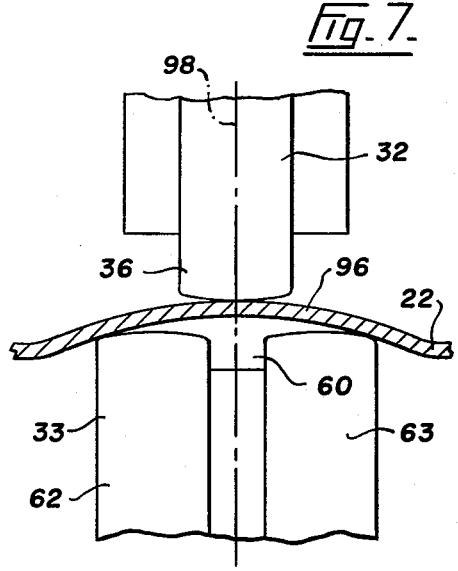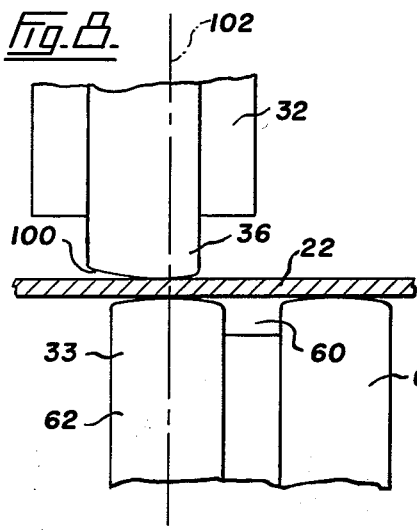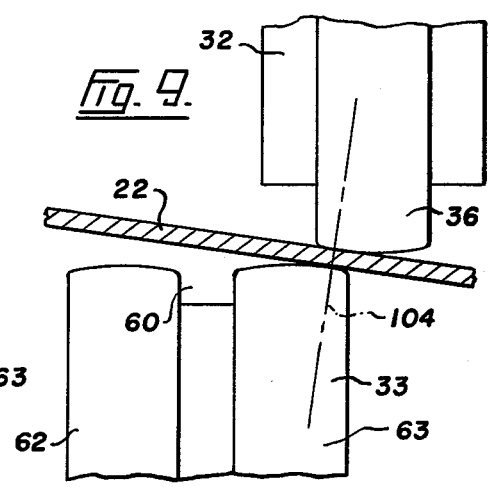

APPARATUS FOR ADJUSTING CONDITION OF METAL OF SAWS

This invention relates to apparatus for adjusting the condition of the metal of saws, such as circular saws and bandsaws, in order to apply thereto or remove therefrom tension, to dish or increase dishing, or decrease or remove dishing from the blades, or remove kinks or lumps therefrom.

The trend in recent years is towards the use of thinner circular saws and bandsaws than previously used in order to narrow the kerfs cut by the saws and thereby reduce the loss of wood as sawdust. However, as the thinner saws are used, the problem of keeping them steady enough to cut on straight lines arises. In addition to this, a thin saw tends to wobble so that a kerf is cut which is wider than the thickness of the saw.

As the saws became thinner, it was found that the wooble action could be greatly reduced or eliminated by tensioning the metal of the saw and/or by dishing the saw. During use, the tooth edge of a circular saw travels at very high speeds, something in the order of 10,000 lineal feet per minute. Bandsaws travel at similar speeds. With circular saws centrifugal force draws the saw edge outwardly in a radial direction, and when the saw has been properly tensioned and dished, it becomes very rigid and lies in a flat plane so that the saw cuts on a straight line while producing a minimum of sawdust. Rigidity is attained in bandsaws by subjecting them to longitudinal strain during use.

Under normal use, these saws often lose their tension, lose their dish or become too dished, and attain sharp kinks, lumps and depressions in the surface thereof. Until fairly recently, the tensioning, dishing and/or flattening out of saws was accomplished entirely by hammering against the surfaces thereof. Even now a large percentage of the saws in use are treated by the hammering process. This is a slow, tedious job, and it relies upon the skill of the person using the hammer. The tension and the dish is adjusted by hammering over the entire surface of the saw blade, while kinks and lumps are removed by hammering the portion of the blade in which these are located. This results in a very rough surfaced saw, often damages the saw, and keeps the saw out of use for a considerable period of time. As guides are provided adjacent the opposite surfaces of thin circular saws and thin bandsaws in order to help them run true, the rough surfaces of the saws often cause trouble since these guides are usually set between 0.003 inch and 0.005 inch from the saw.

The hammering method is still widely used, although a machine was developed fairly recently utilizing powered rolls for adjusting the metal condition of saws. This apparatus includes single upper and lower rolls between which the saw is rolled. Although this machine is an improvement over the hammer method, it is not entirely satisfactory, and still requires considerable time for treating a saw. In addition, the single rolls are frequently out of adjustment relative to each other as a result of wear and the transverse curvature of the peripheral surfaces of the rolls.

With the prior single upper and lower roll arrangement, it is necessary to use pressure screws when the apparatus is used to remove kinks from the saw blades. These are vertical screws located on opposite sides of the rolls to support portions of the saws out of line with the nip of the rolls, and they have to be adjusted up or down for each dekinking operation. This adjustment is made by guess or trial and error so that the saw to be dekinked usually has to be shifted and the screws adjust several times before everything is properly set for the dekinking operation. The adjustment operation consumes time, the screws require maintenance, and the friction of the saw moving over the screws as the kink is being rolled out caused a high pitched screeching noise that is irritating to all within range.

The apparatus of the present invention is a considerable improvement over what has been done in the past. This apparatus includes upper and lower pressure rolls, the lower roll of which has an annular groove in the periphery thereof dividing it into two annular roll sections. One of the rolls is mounted for movement in an axial direction, and means is provided for moving said roll to locate either annular section or the groove of the lower roll in line with the upper roll. The terms "upper" and "lower" are used for convenience, it being understood that the single roll may be the lower one and the double roll the upper one. However, it is more convenient to make the upper and lower rolls the single and double rolls, respectively.

The present apparatus eliminates the necessity of using pressure screws with the attendant problems in association with the rolls during a dekinking operation. The two annular roll sections of the lower roll take the place of the pressure screws when the upper roll is located over the annular groove of said lower roll. The lower roll can be quickly shifted laterally relative to the upper roll in order to provide a wide range of adjustments for different dekinking operations. If the roll surfaces are worn or improperly ground, the lower roll can be shifted so as to properly align the portions of these surfaces that engage the saw therebetween to ensure the pressure being exerted in the direction normal to the saw surfaces. When the portion of the saw between the rolls is inclined relative to the horizontal, the relative shifting of the rolls will cause portions of their peripheral surfaces to grip the inclined surface so that the pressure is applied thereto in the correct direction.

Apparatus in accordance with this invention comprises support means for supporting a saw for movement in the plane of the saw, a first roll positioned to engage one face of the supported saw and to roll over said one face, a second roll positioned to engage an opposite face of the supported saw in opposition to the first roll and to roll over said opposite face in the same direction as the first roll, said rolls being rotatable on substantially parallel axes, said second roll having an annular groove in the periphery thereof dividing said periphery into two annular roll sections, pressure means for moving one of said rolls towards the other of said rolls to cause the rolls to grip the saw therebetween, and power means connected to at least one of said rolls operable to rotate said roll.

More specifically, the present apparatus comprises a base, a first support mounted on the base, a second support mounted on the base beneath and spaced from the first support with a gap therebetween, a support outwardly of the base for movably supporting a saw with a portion thereof in said gap, a first roll mounted on the first support and extending into the gap to engage the upper face of the supported saw to roll over said upper face, a second roll mounted on the second support and extending into the gap to engage the lower face of the supported saw to roll over said lower face in opposition to and in the same direction as the first roll, said rolls being rotatable on substantially parallel axes, said second roll having an annular groove in the periphery thereof dividing said periphery into two annular roll sections, pressure means on the first support for moving the first roll towards the second roll to cause the rolls to grip the saw therebetween, and power means connected to the second roll operable to rotate said second roll.

Apparatus, by way of example, for carrying out this invention is illustrated in the accompanying drawings, in which:

FIG. 1 is a side elevation of the metal conditioning apparatus for a circular saw, FIG. 2 is a vertical section taken on the line 2—2 of FIG. 1, and showing the main part of the apparatus in end elevation, FIG. 3 is an enlarged vertical section taken on the line 3—3 of FIG. 1, FIG. 4 is an enlarged vertical section taken on the line 4—4 of FIG. 2, FIG. 5 is a diagrammatic sectional view through a circular saw showing the dish thereof in exaggerated manner, FIG. 6 diagrammatically and exaggeratedly illustrates one set-up of the rolls for an ordinary stretching operation, FIG. 7 diagrammatically illustrates a dekinking operation, FIG. 8 shows the setting when a roll is worn or improperly ground, FIG. 9 shows the setting when the blade surface is inclined at the rolls, and FIG. 10 diagrammatically illustrates the metal conditioning apparatus for a bandsaw.

Referring to FIGS. 1 to 4 of the drawings, 10 is apparatus in accordance with this invention for adjusting the condition of the metal of circular saws. This apparatus includes a base 12 having a lower support 14 facing an upper support 16 with a gap 18 therebetween. A support 20 is located outwardly of base 12 for rotatably supporting a circular saw 22, shown in broken lines in FIG. 1, in a horizontal position with a portion of the saw extending into gap 18. In this example, support 20 is mounted on the outer ends of a pair of arms 24 which straddle base 12 and extend along the sides thereof. These arms slide on rollers 25 mounted on the sides of the base near the front end thereof, see FIG. 1, and extend through clamps 26 mounted on the base near the back end thereof. The arms 24 can be moved longitudinally of the base, and secured in any desired position by clamps 26. Support 20 has a threaded pin 28 projecting upwardly therefrom and over which the hole at the center of the blade 22 fits, and a wing nut 29 threaded on this pin retains the blade in place while allowing it to rotate in its horizontal plane.

An upper roll 32 is mounted on upper support 16 in line with a lower roll 33 mounted on lower support 14. Roll 32 has a peripheral edge 36 which preferably is slightly curved in cross section, as shown in FIG. 4. This roll is mounted on a short shaft 37 carried by bearings 38 within a block 39 slidably mounted for vertical movement in upper support 16. Block 39 is retained and guided within support 16 by side walls 42 of the support, inner wall 43, and cover 44 which removably closes the front end of support 16 and is retained in place in any suitable manner, such as by bolts 45.

Suitable means is provided for shifting block 39 and, consequently, roll 32 up and down within support 16. In this example, a threaded shaft 48 has a head 49 on its lower end fitting within a socket 50 in the upper surface of block 39 and retained in place by a plate 51 secured to the block by bolts 52. This shaft extends upwardly and is threaded through a nut 55 mounted on the top of support 16, and has a head 56 fixedly secured to its upper end and from which a handle 57 projects. This handle is relatively long so that considerable leverage is attained for turning the shaft 48 to move roll 32 downwardly.

Lower roll 33 is much wider and thicker than roll 32, and has an annular groove 60 in the periphery thereof dividing this periphery into two annular roll sections 62 and 63. Each of these roll sections has a peripheral edge which is preferably transversely curved, as shown in FIG. 4. Roll 33 is in effect a double roll with a peripheral groove 60 in the center thereof.

Roll 33 is mounted on a shaft 65 carried by bearings 66 mounted in a block 67 mounted for horizontal sliding movement on lower support 14. Roll 33 is mounted for axial sliding movement on shaft 65 but is made to rotate therewith by keys 68, see FIG. 3. One end of roll shaft 65 is coupled to a drive shaft 70 which is rotatably mounted at one end in block 67 and extends rearwardly and is coupled to the drive shaft of a fluid or electric motor 71 carried by base 12, see FIG. 1.

Block 67 is slidably mounted in support 14 for movement to shift roll 33 axially relative to roll 32. It will be noted that shafts 37 and 65 of the upper and lower rolls are parallel so that the lower roll can be shifted to bring either roll section 62 or 63 or center groove 60 into alignment with the upper roll. In this example, block 67 has a lug 75 projecting downwardly therefrom through an elongated opening 76 formed in support 14, see FIG. 4. A threaded shaft 78 is threaded through a hole 79 in lug 75, and extends through a supporting plate 80 depending from the front end of lower support 14. Shaft 78 has a collar 81 thereon rotatably fitting in a recess 82 in plate 80 and is retained therein by a retainer 83 removably secured to plate 80. Shaft 78 is formed with a squared outer end 86 for receiving a crank or key, not shown. When shaft 78 is rotated, block 67 moves inwardly or outwardly of support 14, the direction depending upon the direction of rotation of the shaft.

When it is desired to use apparatus 10, the circular blade 22 to be dealt with is placed on pin 28 of support 20 and the carriage is shifted towards or away from base 12 so that a desired portion of the saw is located in gap 18 between upper and lower rolls 32 and 33. The arms 24 are secured in place by clamps 26 and then shaft 48 is rotated by means of handle 57 to lower roll 32 against the saw blade to press it against lower roll 33 and to apply the desired degree of pressure against the blade. Before the pressure is applied, however, shaft 78 is rotated to shift roll 33 to bring either roll section 62 or 63 or groove 60 into alignment with the upper roll. Lower roll 33 is rotated by motor 71 to cause blade 22 to rotate around pin 28 of carriage 20, at which time the portion of the blade in the nip of the rolls is subjected to the pressure exerted by said rolls. The roll is rotated only relatively slowly, for example something of the order of 50 R.P.M.

FIG. 5 diagrammatically illustrates dished saw blade 22 in section, while FIGS. 6 to 9 diagrammatically illustrate different operations of this apparatus, each of these Figures being exaggerated for the sake of clarity.

If it is desired to increase the tension in the metal of blade 22 or to increase the dish thereof, the blade is subjected to a roller operation in the vicinity of its centre, as indicated at 90. The metal is stretched by this operation, and as the peripheral edge 92 of the blade remains constant, the stretched metal increases the dish of the blade as well as increasing the tension in the metal between the centre and its peripheral edge. If it is desired to decrease the tension or the amount of dish, the blade is rolled at or near the edge thereof, as indicated at 93. This stretches the metal at the edge of the blade thereby decreasing the amount of tension and dish. A kink 96 is shown in blade 22.

For a stretching operation the upper roll 32 is positioned directly above either roll section 62 or 63, the upper roll being shown above section 62 in FIG. 6, and the portion of blade 22 between the two rolls is subjected to pressure during the roller operation. The direction of the pressure is normal to the blade as indicated by line 97. The result of this on the blade depends upon whether the rolling takes place in area 90 or 93 of the blade.

FIG. 7 shows the kink 96 of the blade between the rolls. This time, lower roll 33 is shifted so that its groove 60 is directly beneath upper roll 32. The rolling action presses kink 96 back into the plane of the blade. The line 98 indicates the direction of the pressure normal to the blade. The lower roll can be shifted to bring either roll section 62 or 63 closer to the upper roll in order to be sure that the metal forming kink 96 is not pressed too far which would result in a kink projecting from the opposite face of the blade.

If the surface of one of the rolls is not ground properly or is worn as shown at 100 on roll 32 in FIG. 8, the lower roll can be shifted relative to the upper roll so that pressure is directed against the blade at right angles thereto along the pressure line 102. This enables the rolls to be adjusted relative to each other very quickly and easily in order to be sure that the pressure is directed properly through the metal of the blade regardless of the fact that the surface of the upper roll may be improperly ground or worn. The same type of adjustment can be made if the surface of the lower roll is worn or improperly ground.

Sometimes the portion of the blade between the upper and lower rolls is inclined out of the horizontal plane as shown in FIG. 9. In this case, the lower roll can be shifted laterally so that the pressure through the blade, indicated by 104, is at right angles to the portion of the blade between the rolls.

FIG. 10 diagrammatically illustrates apparatus 10a for treating a bandsaw 110, the only difference from apparatus 10 being in the support for the saw. The illustrated support is the type used for bandsaws in the machines of the prior art. In this example, the support comprises an anvil 115 positioned adjacent machine 10a, a wheel 116 rotatably carried by a frame 119 spaced laterally from the machine, and a plurality of parallel rollers 122 carried by a frame 123 below the level of machine 10a.

When it is desired to treat bandsaw 110, it is placed on rolls 122 with a portion extending over wheel 116, over anvil 115 and between rolls 32 and 33. During the operation, the bandsaw is gripped between the upper and lower rolls, and rotation of one of the rolls causes the bandsaw to travel around wheel 116, over rolls 122 and between said rolls 32 and 33. The blade is treated as described above and illustrated in FIGS. 6 to 9.

From the above description it will be realized that by making one of the rolls with two roll sections and a groove therebetween and by mounting one of the rolls so that it can be shifted axially relative to the other, the problems resulting from hammering or use of a pair of single rolls are eliminated. This apparatus can be very quickly and easily adjusted to meet the various situations, it only being necessary to shift the one roll axially relative to the other to meet the different situations. Either or both of the pressure rolls may be driven. Another advantage is that the upper and lower pressure rolls of the invention may be incorporated in machines now in existence for treating circular saws and bandsaws.

I claim:

1. Apparatus for adjusting the condition of the metal of saws, comprising support means for supporting a saw for movement in the plane of the saw, a first roll positioned to engage one face of the supported saw and to roll over said one face, said first roll having a peripheral surface slightly curved in cross section, a second roll positioned to engage an opposite face of the supported saw in opposition to the first roll and to roll over said opposite face in the same direction as the first roll, said rolls being rotatable on substantially parallel axes and said axes being parallel to the plane of the saw on said support means, said second roll having an annular groove in the periphery thereof dividing said periphery into two annular roll sections of the same diameter, the peripheral surfaces of said roll sections being parallel to said saw plane, the peripheral surfaces of said first roll and each of said roll sections being slightly curved in cross section, pressure means for moving one of said rolls towards the other of said rolls to cause the rolls to grip the saw therebetween, shifting means connected to one of said rolls for changing the relative position axially of the first roll and the second roll selectively to locate the peripheral surface of the first roll opposed to any portion of the peripheral surface of either of the annular roll sections and of said annular groove, and power means connected to one of said rolls operable to rotate the latter roll.

2. Saw apparatus as claimed in claim 1 in which the width of the annular groove of the second roll is less than the thickness of the first roll.

3. Saw apparatus as claimed in claim 1 in which said first roll is positioned above the plane of the saw, and said second roll is positioned below the saw plane.

4. Saw apparatus as claimed in claim 1 in which the power means is connected t0 the second roll.

5. Saw apparatus as claimed in claim 1 in which said first and second rolls are positioned to roll over the saw surfaces in a circumferential direction.

6. Saw apparatus as claimed in claim 1 including movable means supporting said saw supporting means for movement towards and away from said rolls.

7. Saw apparatus as claimed in claim 1 in which said shifting means comprises a threaded shaft connected to said one roll and rotatable to shift said one roll relative to the other of said rolls.

8. Saw apparatus comprising a base, a first support mounted on the base, a second support mounted on the base beneath and spaced from the first support with a gap therebetween, a saw support outwardly of the base for movably supporting a saw for movement in the plane of the saw and with a portion thereof in said gap, a first roll mounted on the first support and extending into the gap to engage the upper face of the supported saw to roll over said upper face, a second roll mounted on the second support and extending into the gap to engage the lower face of the supported saw to roll over said lower face in opposition to and in the same direction as the first roll, said rolls being rotatable on substantially parallel axes, said second roll having an annular groove in the periphery thereof dividing said periphery into two annular roll sections of the same diameter, the peripheral surfaces of said roll sections being parallel to said saw plane, the peripheral surfaces of said first roll and each of said roll sections being slightly curved in cross section, pressure means for on the first support for moving the first roll towards the second roll to cause the rolls to grip the saw therebetween, shifting means connected to the second roll for changing the relative position axially of the first roll and the second roll selectively to locate the peripheral surface of the first roll opposed to any portion of the peripheral surface of either of the annular roll sections and of said annular groove, and power means connected to the second roll operable to rotate said second roll.

9. Saw apparatus as claimed in claim 8 in which said power means comprises a motor mounted on the base, a drive shaft connected to and rotated by said motor, said second roll being mounted on said shaft to rotate therewith and to move axially thereof.

10. Saw apparatus as claimed in claim 8 in which the width of the annular groove of the second roll is less than the thickness of the first roll.

11. Saw apparatus as claimed in claim 10 including means movably mounted on the base and projecting outwardly therefrom and supporting said saw support for movement towards and away from said rolls.

12. Saw apparatus as claimed in claim 8 in which said first and second rolls are positioned to roll over the saw surfaces in a circumferential direction.

13. Saw apparatus as claimed in claim 8 including means movably mounted on the base and projecting outwardly therefrom and supporting said saw support for movement towards and away from said rolls.

14. Saw apparatus as claimed in claim 8 in which said shifting means comprises a threaded shaft connected to the second roll and rotatable to shift said second roll relative to the first roll.

* * * * *